United States Patent
Wakuda

(10) Patent No.: US 9,639,142 B2
(45) Date of Patent: May 2, 2017

(54) APPARATUS AND METHOD FOR CONTROLLING POWER CONSUMPTION OF DEVICES PERFORMING COMMUNICATIONS BETWEEN A PROCESSOR AND I/O DEVICES

(71) Applicant: FUJITSU LIMITED, Kawasaki-shi, Kanagawa (JP)

(72) Inventor: Rinko Wakuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 14/631,224

(22) Filed: Feb. 25, 2015

(65) Prior Publication Data

US 2015/0277531 A1 Oct. 1, 2015

(30) Foreign Application Priority Data

Mar. 31, 2014 (JP) .................................. 2014-074257

(51) Int. Cl.
*G06F 1/32* (2006.01)

(52) U.S. Cl.
CPC .......... *G06F 1/3278* (2013.01); *Y02B 60/126* (2013.01)

(58) Field of Classification Search
CPC .......... G06F 1/32; G06F 1/325; G06F 1/3203; G06F 1/3296
USPC ........................................................ 713/320
See application file for complete search history.

(56) References Cited

U.S. PATENT DOCUMENTS

| 7,103,760 | B1* | 9/2006 | Billington | G06F 1/266 399/107 |
| 7,279,856 | B1* | 10/2007 | Sullivan | H05K 7/20727 307/64 |
| 2006/0161714 | A1 | 7/2006 | Sue | |
| 2009/0094401 | A1 | 4/2009 | Larson et al. | |
| 2010/0199116 | A1* | 8/2010 | Qi | G06F 1/325 713/324 |
| 2010/0312942 | A1* | 12/2010 | Blinick | G06F 13/4022 710/316 |
| 2011/0060931 | A1* | 3/2011 | Radhakrishnan | G06F 1/3203 713/340 |
| 2013/0060987 | A1* | 3/2013 | Bolen | G06F 13/00 710/316 |
| 2013/0159585 | A1* | 6/2013 | Ogawa | G06F 13/4291 710/305 |

(Continued)

FOREIGN PATENT DOCUMENTS

JP 2006-201881 8/2006
JP 2009-93636 4/2009

*Primary Examiner* — Vincent Tran
(74) *Attorney, Agent, or Firm* — Staas & Halsey LLP

(57) ABSTRACT

An information processing apparatus is connected to a plurality of input/output devices. The information processing apparatus includes an arithmetic processing device configured to perform a computation, and a plurality of communication devices each configured to perform a communication between the plurality of input/output devices and the arithmetic processing device. The information processing apparatus further includes a determination unit configured to determine a communication device whose power consumption is controllable, among the plurality of communication devices, and a managing unit configured to suppress power consumption of the communication device determined by the determination unit.

7 Claims, 5 Drawing Sheets

(56) References Cited

U.S. PATENT DOCUMENTS

| | | | |
|---|---|---|---|
| 2014/0006826 A1* | 1/2014 | Wagh | G06F 13/4282 |
| | | | 713/323 |
| 2014/0075231 A1* | 3/2014 | Jouin | G06F 1/3287 |
| | | | 713/324 |
| 2014/0195835 A1* | 7/2014 | E. | G06F 1/3253 |
| | | | 713/323 |
| 2014/0351893 A1* | 11/2014 | Corddry | H04L 67/22 |
| | | | 726/3 |
| 2015/0095687 A1* | 4/2015 | Spry | G06F 1/3287 |
| | | | 713/324 |
| 2015/0277531 A1* | 10/2015 | Wakuda | G06F 1/3278 |
| | | | 713/320 |

* cited by examiner

APPARATUS AND METHOD FOR CONTROLLING POWER CONSUMPTION OF DEVICES PERFORMING COMMUNICATIONS BETWEEN A PROCESSOR AND I/O DEVICES

CROSS-REFERENCE TO RELATED APPLICATION

This application is based upon and claims the benefit of priority from the prior Japanese Patent Application No. 2014-074257 filed on Mar. 31, 2014, the entire contents of which are incorporated herein by reference.

FIELD

The embodiments discussed herein are related to apparatus and method for controlling power consumption of devices performing communications between a processor and I/O devices.

BACKGROUND

A central processing unit (CPU) serving as an arithmetic processing device which is mounted in an information processing apparatus obtains data from an IO device to process the data. In the information processing apparatus, the communication between the CPU and the IO device is generally performed through a device for communication (hereinafter, referred to as a "communication device"). The communication device may specifically be a bridge large scale integrated circuit (LSI) or a switch LSI.

Generally, a plurality of communication devices is provided in the information processing apparatus to perform communications with the IO device. In the information processing apparatus capable of connecting a plurality of IO devices, the communication devices are connected to each other such that a topology of the connection has a tree structure.

Recently, the demand for power saving is strongly required to suppress the power consumption of the information processing apparatus. In accordance with the demand, a power saving function is provided even in a communication device whose power consumption is comparatively low.

For example, in a peripheral component interconnect express (PCIe) standard, a power management feature called an active-state power management (ASPM) is defined and two communication devices which are connected to each other through a link may be shifted to a power saving state in accordance with a status of the link. That is, the ASPM may suppress the power consumption in accordance with the status of the link.

When the communication devices are shifted to the power saving state, a latency of the link is increased. Therefore, the ASPM is not necessarily used for the information processing apparatus which requires high performance. However, in a circumstance where it is required to suppress power consumption, such as a case where power consumption of the information processing apparatus has a maximum amount or approximates a maximum, it is required to suppress the power consumption of the communication device.

Japanese Laid-Open Patent Publication No. 2006-201881 discloses an information processing apparatus having a PCI Express interface which includes a plurality of lanes, including a controller configured to control the PCI Express interface to maintain an operation state of the interface, and a system managing device which obtains and stores the operation state of the PCI Express interface from the controller when an initial process of the information processing apparatus is completed, and, upon receiving a notice of error occurrence, performs a predetermined corresponding process when degeneration of the number of lanes is detected by comparing the stored operation state with the operation state maintained by the controller.

Japanese Laid-Open Patent Publication No. 2009-93636 discloses an information processing apparatus in which two table data structures are used by a firmware in order to adjust an operating parameter of an end point based on the comparison of a total maximum and/or minimum data transfer rate of a PCIe adaptor/end point (hereinafter, referred to as an end point) with a maximum data transfer rate with respect to a front side bus, that is, a bandwidth of the front side bus. A first table data structure includes various combinations of operating parameter settings in order to control bandwidth usage of each end point of a data processing system. A second table data structure includes a list of end points at which the data processing system supports a related minimum data transfer rate and a priority. Further, the second table data structure instructs which end point has an isochronous requirement.

With respect to the operation, mounted equipment sets a threshold value of an error which may occur during a predetermined period. When the error exceeds the threshold value, the equipment inquires a front side bus performance counter in order to determine whether the front side bus operates at its maximum data transfer rate. When the front side bus does not operate at the maximum data transfer rate, the equipment increases a set value of the data transfer rate with respect to the end point which exceeds the threshold value. When the front side bus operates at its maximum data transfer rate, the equipment inquires all the end points to determine which end point is active. Next, the equipment determines whether there is an end point which has a lower priority than that of a complaining end point. Therefore, the equipment decreases an end point having a low priority by one step and increases the complaining end point by one step. When the front side bus operates at its maximum data transfer rate and there is no end point which is active and has a low priority, the equipment separates only the complaining end point.

SUMMARY

According to an aspect of the invention, there is provided an information processing apparatus connected to a plurality of input/output devices. The information processing apparatus includes an arithmetic processing device configured to perform a computation, and a plurality of communication devices each configured to perform a communication between the plurality of input/output devices and the arithmetic processing device. The information processing apparatus further includes a determination unit configured to determine a communication device whose power consumption is controllable, among the plurality of communication devices, and a managing unit configured to suppress power consumption of the communication device determined by the determination unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, an exemplary embodiment of the present disclosure will be described in detail with reference to the drawings.

Figure 1:
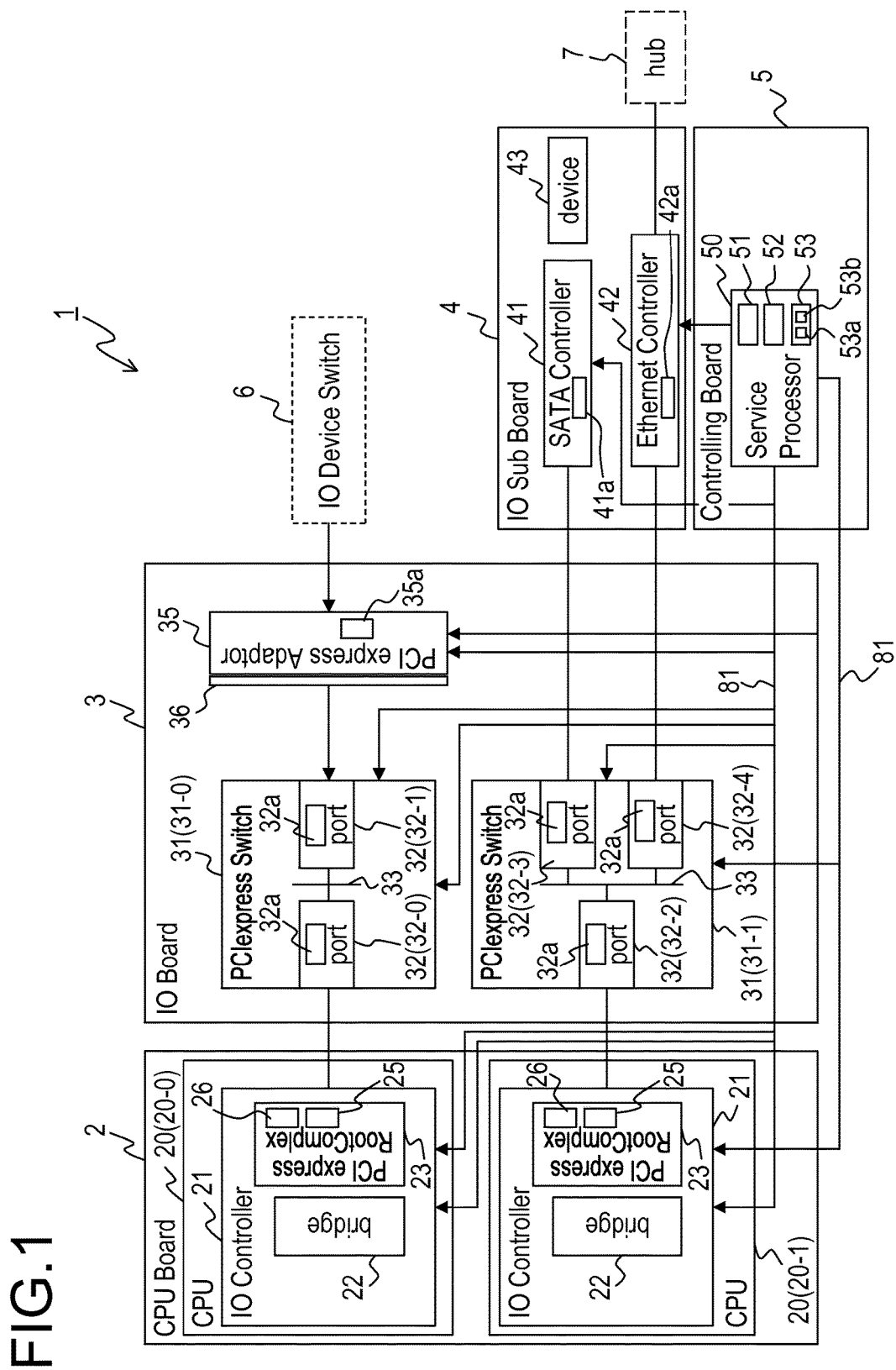
FIG. 1 is a view explaining a configuration example of an information processing apparatus, according to an embodiment.

FIG. 1 is a view explaining a configuration example of an information processing apparatus, according to an embodiment. An information processing apparatus 1 according to the embodiment is, for example, an information processing apparatus which configures an information processing system which is built in a data center. The information processing apparatus 1 may be used as a node which configures a parallel computer and as illustrated in FIG. 1 includes a CPU board 2, an IO board 3, an IO sub board 4, and a controlling board 5.

The CPU board 2 is provided with a plurality of CPUs 20 (20-1 and 20-1). The CPU board 2 is further provided with a memory module and a firmware hub (FWH) in which a firmware is stored.

Figure 2:
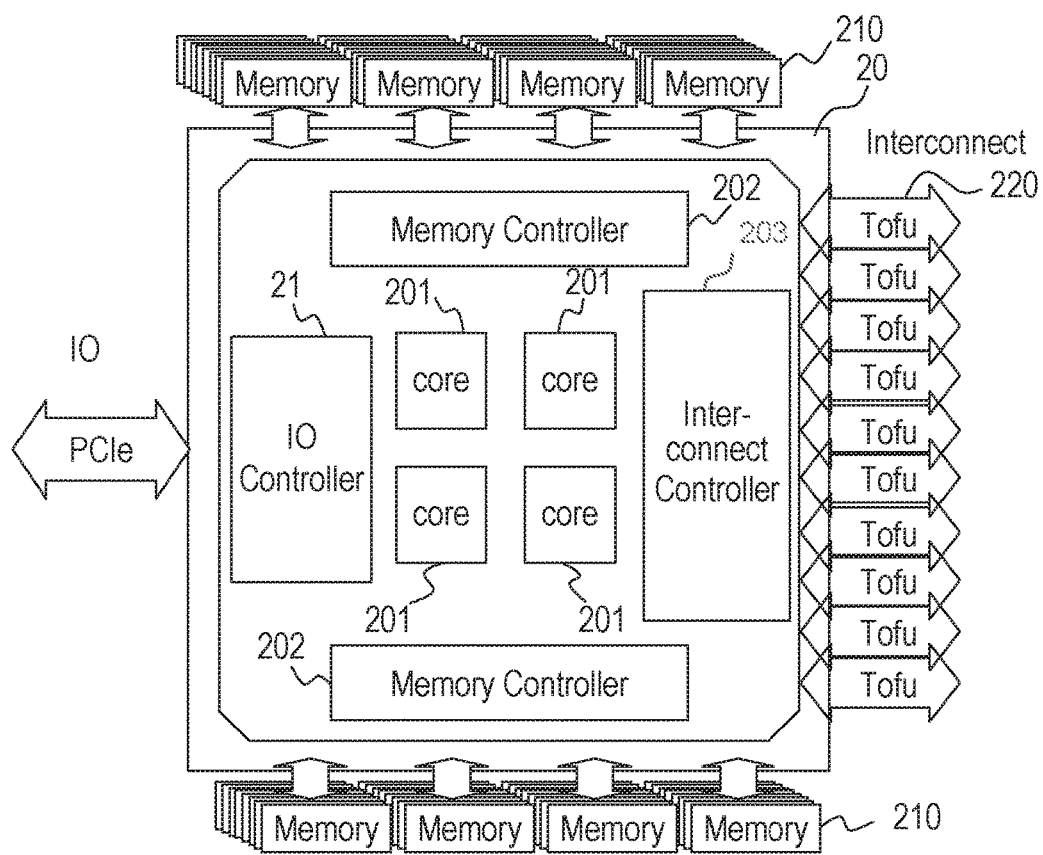
FIG. 2 is a view explaining a configuration example of a CPU which is mounted on a CPU board, according to an embodiment.

FIG. 2 is a view explaining a configuration example of a CPU which is mounted on a CPU board, according to an embodiment.

The CPU 20 whose configuration example is illustrated in FIG. 2 includes four CPU cores 201, two memory controllers 202, an interconnect controller 203, and an IO controller 21. The configuration example illustrated in FIG. 2 is illustrative and the configuration of the CPU 20 is not limited to the example illustrated in FIG. 2. Further, in FIG. 2, only major components are illustrated and a secondary cache and a secondary cache controller are not illustrated.

Each memory controller 202 accesses any one of the memories 210 which is connected to the CPU 20 in accordance with the control by any one of the CPU cores 201. Therefore, each CPU core 201 writes data into any one of the memories 210 or reads out data from the memory 210, through the memory controller 202.

A plurality of nodes which configures a parallel computer is connected by an interconnect which is a dedicated computer network. "Tofu" which is denoted by reference numeral 220 in FIG. 2 is an abbreviation of torus fusion which is an interconnect of 6 dimensional mesh/torus. The interconnect controller 203 realizes data communication with other information processing apparatus (node) 1 through Tofu 220.

The IO controller 21 manages inputting/outputting data into/from the information processing apparatus 1. In the IO controller 21, a bridge 22 and a PCI express root complex (hereinafter, referred to as "root complex") 23 are mounted.

In the PCIe (PCI express), generally, communication devices are connected to each other to form a hierarchical tree structure. The root complex 23 is a communication device which becomes a root of the hierarchy. The bridge 22 performs a required conversion of a protocol between the CPU core 201 and the root complex 23.

The IO board 3 causes various IO devices to be connectable. To this end, the IO board 3 is provided with two PCI express switches (hereinafter, simply referred to as a "switch") 31 (31-0 and 31-1) and a PCI express adaptor (hereinafter, simply referred to as an "adaptor") 35.

The switch 31-0 is a switch in which two ports 32 (32-0 and 32-1) are connected to each other by an internal bus 33. The port 32-0 is connected to the root complex 23 in the IO controller 21 of the CPU 20-0 and the port 32-1 is connected to the adaptor 35. The adaptor 35 is an end point and is inserted into the slot 36 to be mounted on the IO board 3.

A switch 6 for an IO device is connected to the adaptor 35. The switch 6 is, for example, a switch which is supposed to be connected to an external file device (an external storage device). One or more IO devices are added to the information processing apparatus 1 by connecting the switch 6 to the adaptor 35.

The switch 31-1 is a switch in which three ports 32 (32-2 to 32-4) are connected to each other by an internal bus 33. The port 32-2 is connected to an IO controller 21 of the CPU 20-1, the ports 32-3 and 32-4 are connected to a serial AT attachment (SATA) controller 41 and an Ethernet controller 42 on the IO sub board 4. The SATA controller 41 and the Ethernet controller 42 are end points.

The IO sub board 4 is a board on which the IO device may be mounted. In FIG. 1, a "device" which is denoted by an IO device 43 is a storage device, such as a hard disk device or an solid state drive (SSD) in which an operating system (OS) and various application programs (hereinafter, simply referred to as an "application") are stored. The IO device 43 is connected to the SATA controller 41.

A hub 7 is connected to the Ethernet controller 42. A console (a terminal device) for controlling or managing the information processing apparatus 1 may be connected to the hub 7 to be used.

The controlling board 5 is a board in which a service processor 50 which is a managing device which manages the whole information processing apparatus 1 is mounted. The service processor 50 is a computer in which the managing device according to the embodiment is executed, and, for example, is configured to include a micro-processing unit (MPU) 51, a flash memory 52, and a memory 53.

The MPU 51 includes an interface to which a dedicated controlling signal 81 is connected.

The dedicated controlling signal 81 is further connected with the CPUs 20, the switches 31, the adaptor 35, the SATA controller 41, and the Ethernet controller 41. The MPU 51 accesses resources for maintaining the CPUs 20, the switches 31, the adaptor 35, the SATA controller 41, and the Ethernet controller 42 through the dedicated signal 81 to collect necessary information. Further, the CPUs 20, the switches 31, the adaptor 35, the SATA controller 41, and the Ethernet controller 42 perform interrupts for notifying various errors through dedicated signals on the service processor 50, or the CPU 20 performs an interrupt to notify an error on the software so as to notify the error from the software to the service processor 50.

A firmware executed by the MPU 51 is stored in the flash memory 52. The MPU 51 performs various managements including suppressing power consumption of the communication device by executing the firmware.

The root complex 23 mounted in the IO controller 21 of each of the CPUs 20, the switches 31, the adaptor 35, the SATA controller 41, and the Ethernet controller 42 are communication devices (PCIe devices) to connect the IO device. The service processor 50 performs a control to suppress the power consumption of the communication devices in accordance with change of a circumstance.

The CPU 20 activates a firmware which is stored in the FWH to perform initialization by turning on power or resetting a system. At the time of initialization, each CPU 20 recognizes a connection relationship (topology) of the communication devices. Connection information 53a indicating the connection relationship between the communication devices, which is obtained from the recognition result, is transmitted from the CPUs 20 to the service processor 50 through the dedicated signal 81 to be stored in the memory 53 of the service processor 50. The service processor 50 performs a control of suppressing the power consumption of the communication devices by using the stored connection information 53.

In the embodiment, as the change of the circumstance which becomes a momentum to perform a control of suppressing power consumption of the communication device, an occurrence of a failure is assumed. Here, for descriptive purpose, as the failure, only stopping of the communication device and an occurrence of an error will be exemplified.

Each communication device has an advanced error reporting (AER) function. The AER function is a function of submitting an advanced error report to the PCIe device. A communication device which has the AER function stores information (hereinafter, referred to as an "AER table") obtained by combining various detecting results in a storing unit. Reference numerals 26, 32a, 35a, 41a, and 42a in FIG. 2 denote storing units in which the AER table is stored. Here, when there is no need to specify a communication device which includes a storing unit, a reference numeral is not assigned to the storing unit.

The AER table includes a plurality of registers. The registers include a register (hereinafter, referred to as an "uncorrectable error register") in which information relating to an uncorrectable error is stored. Uncorrectable errors whose statuses are represented in the uncorrectable error register includes poisoned TLP, unexpected completion, an ECRC error, an unsupported request, malformed TLP, and a flow control protocol error. All these errors cause a target component to be exchanged. Therefore, in the embodiment, a communication device from which any one error is detected is a target to be stopped.

When the uncorrectable error is detected from a communication device other than the communication device mounted in the IO controller 21 of the CPU 20, the error detection is notified to the CPU 20 through an interrupt. A notification of an uncorrectable error to the service processor 50 may be performed by any of the CPU 20 and the communication device from which the uncorrectable error is detected. Here, for descriptive purpose, it is assumed that the communication device from which the uncorrectable error is detected directly notifies the detection of an uncorrectable error to the service processor 50.

The detection of an uncorrectable error is notified to the service processor 50 by the interrupt. When the detection of an uncorrectable error is notified by the interrupt, the service processor 50 accesses the storing unit of a communication device which has performed the interrupt, through the dedicated signal 81, to obtain information of the uncorrectable error register. Therefore, the service processor 50 specifies an error type of an occurring uncorrectable error and performs a control of suppressing the power consumption, in accordance with the specified error type and the communication device which has performed the interrupt.

The connection information 53a is used to specify a range where power consumption is suppressed. The service processor 50 selects, as a suspicious device, a candidate for a communication device in which the uncorrectable error is likely to have occurred actually, based on the error type and the communication device which has performed the interrupt. A communication device to be stopped is selected from the suspicious devices.

The uncorrectable error is detected by actually performing communication. Therefore, actually, the communication device in which the uncorrectable error has occurred may be at any one of a data transmitting side, a data receiving side, and both sides. Accordingly, two communication devices at the data transmitting side and the data receiving side are selected as the suspicious devices. One of the two communication devices is the communication device from which the uncorrectable error is detected.

It is considered that a probability that two communication devices are simultaneously broken is low. Further, as the communication device to be stopped is located at a more upstream side, a range for suppressing power consumption is likely to be broadened, so that a penalty for erroneous selection of the communication device to be stopped is likely to be increased. Accordingly, in the present exemplary embodiment, the communication device to be stopped is a communication device which is located at a downstream side (a side which is farther from the root complex 23) between two communication devices which are the suspicious devices.

After selecting (specifying) the communication device to be stopped, the service processor 50 specifies a range for suppressing power consumption, from the selected communication device to be stopped, by referring to the connection information 53a, and suppresses power consumption of communication devices which are present within the specified range. The range for suppressing power consumption is a range where an adverse effect is not caused by suppressing power consumption but the occurring uncorrectable error affects. If the power consumption of an IO device affected by suppressing power consumption is controllable, the IO device whose power consumption is controllable is also included in the range where power consumption is suppressed. In order to suppress the power consumption of the communication device or the IO device located within the range where power consumption is suppressed, the power consumption of the information processing apparatus 1 may be appropriately reduced regardless of a performance required for the information processing apparatus 1.

In order to output a reference clock which is defined in the PCIe specification, a clock generating circuit 25 supplying a clock to each of root complexes is installed on the CPU board.

In addition to the root complex, a memory and an interconnect controller are also mounted in the CPU and a clock supplied to the memory and the interconnect controller and a reference clock supplied to the root complex are separated from each other.

By stopping the output of the reference clock to the root complex 23, power consumption of only the root complex 23 within the communication device is reduced without stopping an operating function in the CPU. In the embodiment, when the root complex 23 is included in the specified range, the output of the reference clock to the root complex 23 is stopped. Further, a power source, that is, power supply is stopped in communication devices, which are present in the specified range, other than the root complex 23, such as the switch 31, the adaptor 35, the SATA controller 41, and the Ethernet controller 42. By doing this, in the embodiment, for communication devices other than the root complex 23, a power source is stopped in units of communication devices, thereby further suppressing the power consumption of the information processing apparatus 1.

The power source may be stopped in units of communication devices, for example, by allowing the service processor 50 to turn on/off a power circuit (for example, a DC (direct current)-DC converter) which is mounted in each communication device. The dedicated signal 81 is also used by the service processor 50 to control power consumption of the communication devices. Further, the power source may be stopped in units of communication devices by controlling devices other than the power circuit. For example, the power source may be stopped by stopping the supply of power to each of communication devices. The power source may be stopped in units of the ports 32 of the switch 31 so that the suppression of power consumption is more minutely controlled.

Here, with reference to the configuration example illustrated in FIG. 1, a range for suppressing power consumption, which is specified by suspicious devices, will be described in detail.

In the configuration example illustrated in FIG. 1, when a communication device to be stopped is the root complex 23 of the CPU 20-0, any one of the ports 32 of the switch 31-0, or the adaptor 35, the range for suppressing power consumption becomes a range including all of them. Therefore, the clock generating circuit 25 of the root complex 23 of the CPU 20-0 is stopped, and the power sources of the switch 31-0 and the adaptor 35 are stopped.

When a communication device to be stopped is the root complex 23 of the CPU 20-1 or the port 32-2 of the switch 31-1, the range for suppressing power consumption becomes a range including the root complex 23 and all the positioned on the downstream side thereof. Therefore, the clock generating circuit 25 of the root complex 23 of the CPU 20-1 is stopped and all the power sources of the switch 31-1, the SATA controller 41, the Ethernet controller 42, and the IO device 43 are stopped.

When a communication device to be stopped is the port 32-3 of the switch 31-1 or the SATA controller 41, the range for suppressing power consumption becomes a range including the SATA controller 41 and all the devices positioned on the downstream side thereof. Therefore, all the power sources of the SATA controller 41 and the IO device 43 are stopped.

When a communication device to be stopped is the port 32-4 of the switch 31-1 or the Ethernet controller 42, the range for suppressing power consumption becomes a range including only the Ethernet controller 42. Therefore, only the power source of the Ethernet controller 42 is stopped.

According to the embodiment, the power consumption is also suppressed by incurring (detecting) an error other than the uncorrectable error.

Currently, there exists a communication device capable of automatically adjusting a transfer rate, among the communication devices which perform communication in accordance with the PCIe standard. In the embodiment, upon adjustment of a transfer rate to a slower transfer rate than a predetermined transfer rate (bandwidth), that is, upon occurrence (detection) of an error which degrades the bandwidth, power consumption is suppressed as needed basis.

Upon detecting the degradation of the bandwidth, a downstream port of the communication device notifies the detection of degradation of the bandwidth to the CPU 20 and the service processor 50. A service processor 50 to which the degradation of the bandwidth is notified checks whether the performance is recovered, that is, the bandwidth is recovered, by causing the two communication devices to perform retraining with a predetermined value (hereinafter, referred to as a "threshold value") as an upper limit.

When the performance of a link is temporarily degraded, the bandwidth is recovered by retraining, and, for example, it is expected that the link is upgraded to a maximum transfer rate and a maximum number of lanes. From this point of view, in the embodiment, when the bandwidth is not recovered, it is considered that a permanent failure occurs in one of the two communication devices connected to the link, and the suppression of power consumption is performed. In this case, since the suspicious devices are two communication devices which are connected to the link, it is determined that the communication device to be stopped is a communication device which is located on a downstream side between the suspicious devices, for the same reason in the case of detecting the uncorrectable error.

Even when the performance of the link is degraded, communication is possible. Therefore, in the embodiment, whether to suppress power consumption due to the degradation of the performance of the link is determined in accordance with information for determination (hereinafter, referred to as "continuation-determination information") 53b. The continuation-determination information 53b is information indicating, for example, whether to treat the degradation of the performance as a permanent failure for each of links, and is stored, for example, in the service processor 50 by using a terminal device, such as a console which is directly or indirectly connected to the hub 7. In FIG. 2, even though the continuation-determination information 53b is depicted in the memory 53, the flash memory 52 may be also used to store the continuation-determination information 53b.

The range for suppressing power consumption, which is specified when the degradation of the performance is treated as a permanent failure, is the same as the range specified when the uncorrectable error is detected.

Suppressing power consumption by considering that a permanent failure occurs in one of the two communication devices connected to a link whose performance is not recovered, allows the power consumption of the information processing apparatus 1 to be further reduced. Among the links whose performances are not recovered, a link which needs to be used for communication, may be continuously used for the communication, in accordance with the continuation-determination information 53b. By doing this, only power consumption which needs to be suppressed is appropriately suppressed.

A stop of the communication device (an erroneous stop) is detected by the communication device which is located on the upstream side or the downstream side, or directly detected by the service processor 50. The stopped communication device is treated as a communication device to be stopped, and a range for suppressing power consumption is specified.

The communication between the CPU 20 and the IO device through the stopped communication device is impossible. Therefore, there is no problem even when power consumption is suppressed within the range for suppressing power consumption, which is specified based on the stopped communication device.

Figure 3:
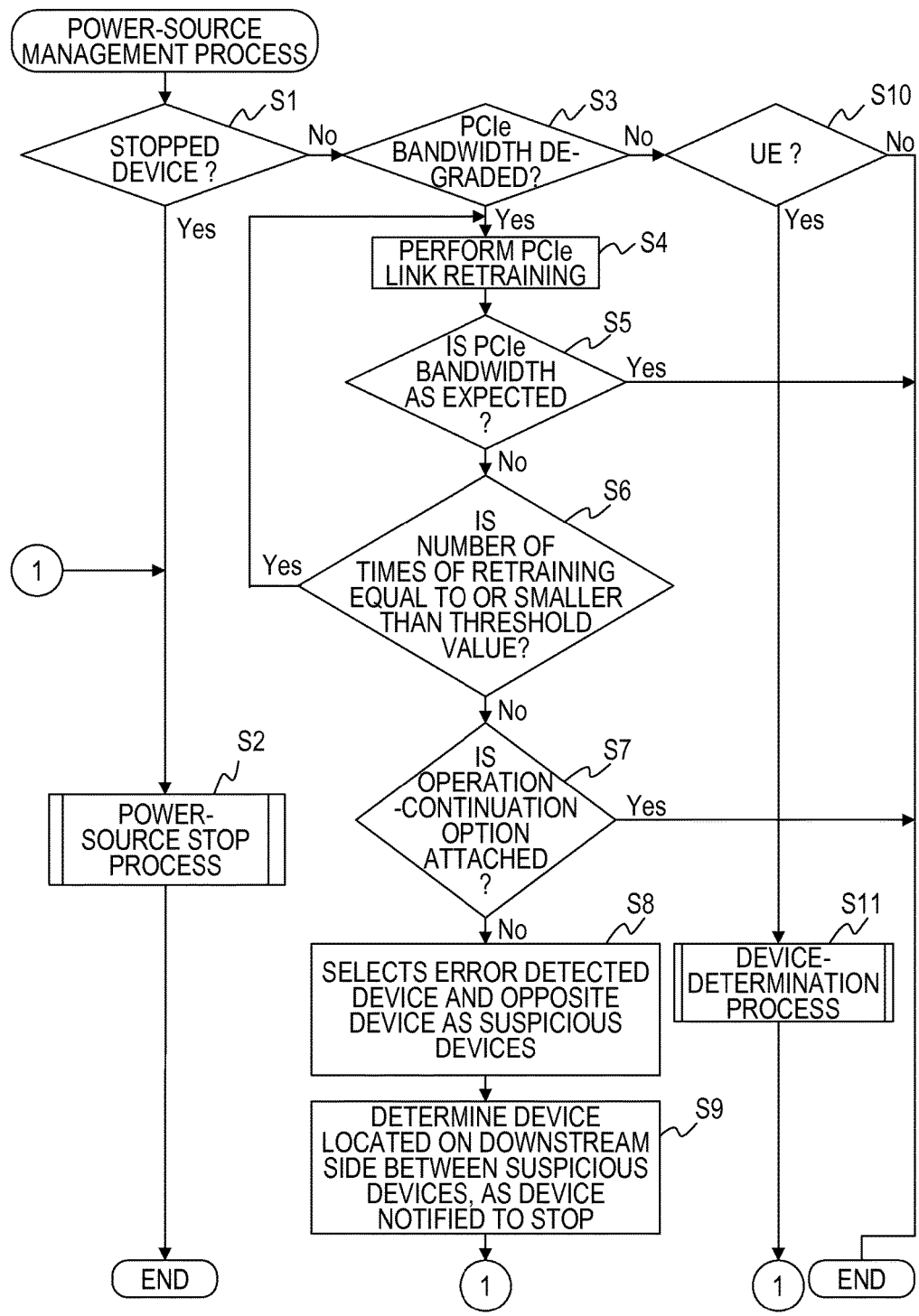
FIG. 3 is a diagram illustrating an example of an operational flowchart for a power-management process, according to an embodiment.

When an error or the stopped communication device is detected, the service processor 50 performs a power-source management process which is illustrated in the operational flowchart of FIG. 3, to suppress the power consumption. Next, an operation of the service processor 50 to suppress power consumption will be described in more detail with reference to FIG. 3.

A power-source management process illustrated in the operational flowchart of FIG. 3 is a process which is performed by the service processor 50 when an uncorrectable error or degradation of the performance (degradation of the bandwidth) is notified, or the stopped communication device is detected. The power-source management process is embodied by causing the MPU 51 of the service processor 50 to execute the firmware of the flash memory 52.

First, the service processor 50 determines whether a stopped communication device is detected (S1). When the stopping of the communication device is notified by another communication device or the service processor 50 recognizes the stopping of the communication device, determination of step S1 is Yes and the sequence proceeds to step S2. When there is no communication device which is newly stopped, determination of step S1 is No and the sequence proceeds to step S3.

In step S2, the service processor 50 specifies a range for suppressing power consumption and performs a power-source stop process to suppress power consumption within the specified range. The power-source management process ends after performing the power-source stop process.

In step S3, the service processor 50 determines whether degradation of a performance (degradation of a bandwidth) of a link is notified. When the degradation of the bandwidth is notified, determination of step S3 is Yes and the sequence proceeds to step S4. When the degradation of the bandwidth is not notified, determination of step S3 is No and the sequence proceeds to step S10.

As described above, in the embodiment, the two communication devices connected to the link in which the bandwidth degradation is detected are caused to perform a retraining (denoted by a "recovery process" and "PCIe LINK retrain process" in FIG. 3) in order to recover the degradation of the bandwidth with a threshold value as an upper limit. The sequence proceeds to step S4 to perform the retraining.

In step S4, the service processor 50 causes the two communication devices, connected to the link where the degradation of the bandwidth is detected, to perform the retraining. Next, the service processor 50 determines whether the bandwidth is recovered to an expected level (S5) by checking the result of the retraining. When the bandwidth is recovered to the expected level, the determination of step S5 is Yes and here, the power-source management process ends. In contrast, when the bandwidth is not recovered to the expected level, the determination of step S5 is No and the sequence proceeds with step S6.

In step S6, the service processor 50 determines whether the number of times of performing the retraining is smaller than a threshold value. When the retraining has been performed as many as the threshold value, the determination of step S6 is No and the sequence proceeds to step S7. When the retraining has not been performed as many as the threshold value yet, the determination of step S6 is Yes and the sequence returns to step S4, and the service processor 50 causes the communication devices to perform the retraining again.

In step S7, the service processor 50 determines whether the link in which the bandwidth has been degraded is set so that the degradation of the bandwidth is treated as a permanent failure, by referring to the continuation-determination information 53*b*. When the link is not set so that the degradation of the bandwidth is treated as a permanent failure, that is, when the operation-continuation option is attached, the determination of step S7 is Yes, and the power-source management process ends. As a result, the link in which the bandwidth is degraded is used while the bandwidth is degraded. In contrast, when the link is set so that the degradation of the bandwidth is treated as a permanent failure, that is, when the operation-continuation option is not attached, the determination of step S7 is No and the sequence proceeds to step S8.

In step S8, the service processor 50 selects two communication devices which are connected to the link in which the bandwidth is degraded, as suspicious devices. One of the selected two communication devices is a communication device from which the degradation of the bandwidth is detected and the other communication device is a communication device (denoted by an "opposite device" in FIG. 3) which is connected to the one communication device through the link.

In step S9 following step S8, the service processor 50 determines a communication device which is located on the downstream side (lower side) between the suspicious devices, as a communication device to be stopped (denoted by a "device notified to stop" in FIG. 3). Thereafter, the sequence proceeds to step S2.

In step S10 which is executed when the determination of step S3 is No, the service processor 50 determines whether the uncorrectable error (denoted by "UE" in FIG. 3) is notified. When an uncorrectable error is notified, the determination of step S10 is Yes and the sequence proceeds to step S11. When none of the uncorrectable errors is notified, the determination of step S10 is No and the power-source management process ends here.

In step S11, the service processor 50 performs a device-determination process for the UE to specify the communication device to be stopped, based on the notified uncorrectable error. Thereafter, the sequence proceeds to step S2.

Figure 4:
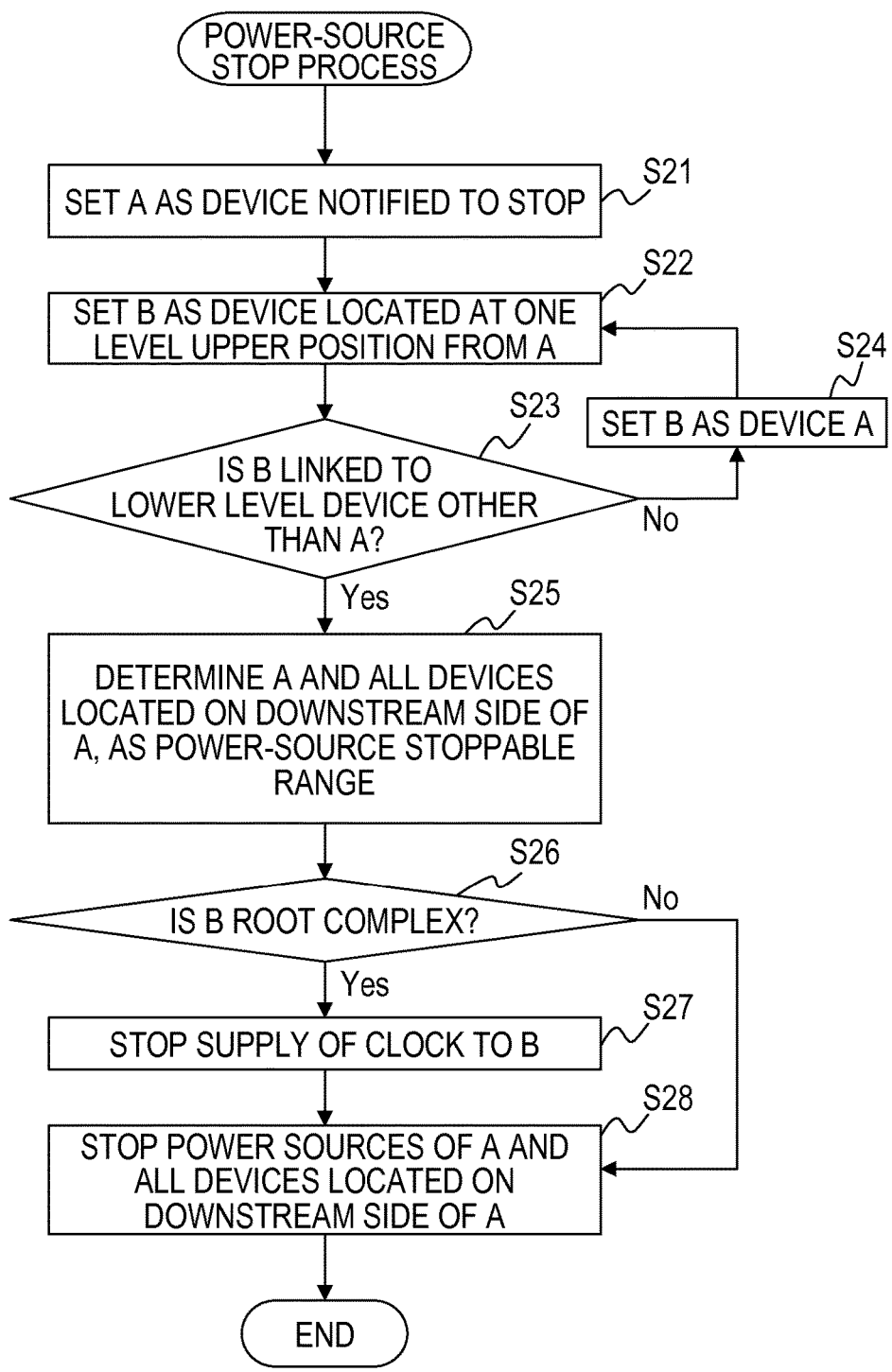
FIG. 4 is a diagram illustrating an example of an operational flowchart for a power-off process, according to an embodiment.

FIG. 4 is an operational flowchart for a power-source stop process which is performed in step S2. Next, the power-source stop process will be described in detail with reference to FIG. 4.

All the downstream sides of a communication device notified to stop and a communication device to be stopped are included in targets whose power consumption is suppressed. Therefore, the range for suppressing power consumption is determined by specifying a range of the upstream side of the communication device notified to stop or the communication device to be stopped.

First, the service processor 50 sets A as a communication device notified to stop (S21). Next, the service processor 50 sets B as a communication device that is connected to the communication device A and located at one level upper position (on the upstream side) from the communication device A (S22). Next, the service processor 50 determines whether a communication device other than A is connected to B by a link (S23). When a communication device other than A is connected to B, the determination of step S23 is Yes and the sequence proceeds to step S25. When a communication device other than A is not connected to B, the determination of step S23 is No and the sequence proceeds to step S24 and B is newly set as A. Thereafter, the sequence returns to step S22. Accordingly, a processing loop formed by steps S22 to S24 searches for an upstream range which is not affected by the suppression of power consumption, by designating a communication device notified to stop or a communication device to be stopped, as the starting point of the search.

The communication device which is located at the uppermost stream is the root complex 23 and there are no communication devices to be searched for, which is located at an upper-stream of the root complex 23. Therefore, when B is the root complex 23, the determination of S23 is Yes.

In step S25, the service processor 50 determines a range for suppressing power consumption (denoted by "power-source stoppable range" in FIG. 3). The range for suppressing power consumption includes A and all the communication devices (in some cases, including the IO device) which are located on the downstream side of A.

In step S26 which comes next to step S25, the service processor 50 determines whether B is the root complex 23. When B is the root complex 23, the determination of step S26 is Yes and the sequence proceeds to step S27. When B is not the root complex 23, the determination of step S26 is No and the sequence proceeds to step S28.

In step S27, the service processor 50 stops outputting a reference clock which is supplied to the root complex 23 of B. Next, the service processor 50 stops the power sources of A and all the communication devices which are located on the downstream side of A. The power-source stop process ends after suppressing power consumption of the communication devices which are present within the specified range for suppressing power consumption.

Figure 5:
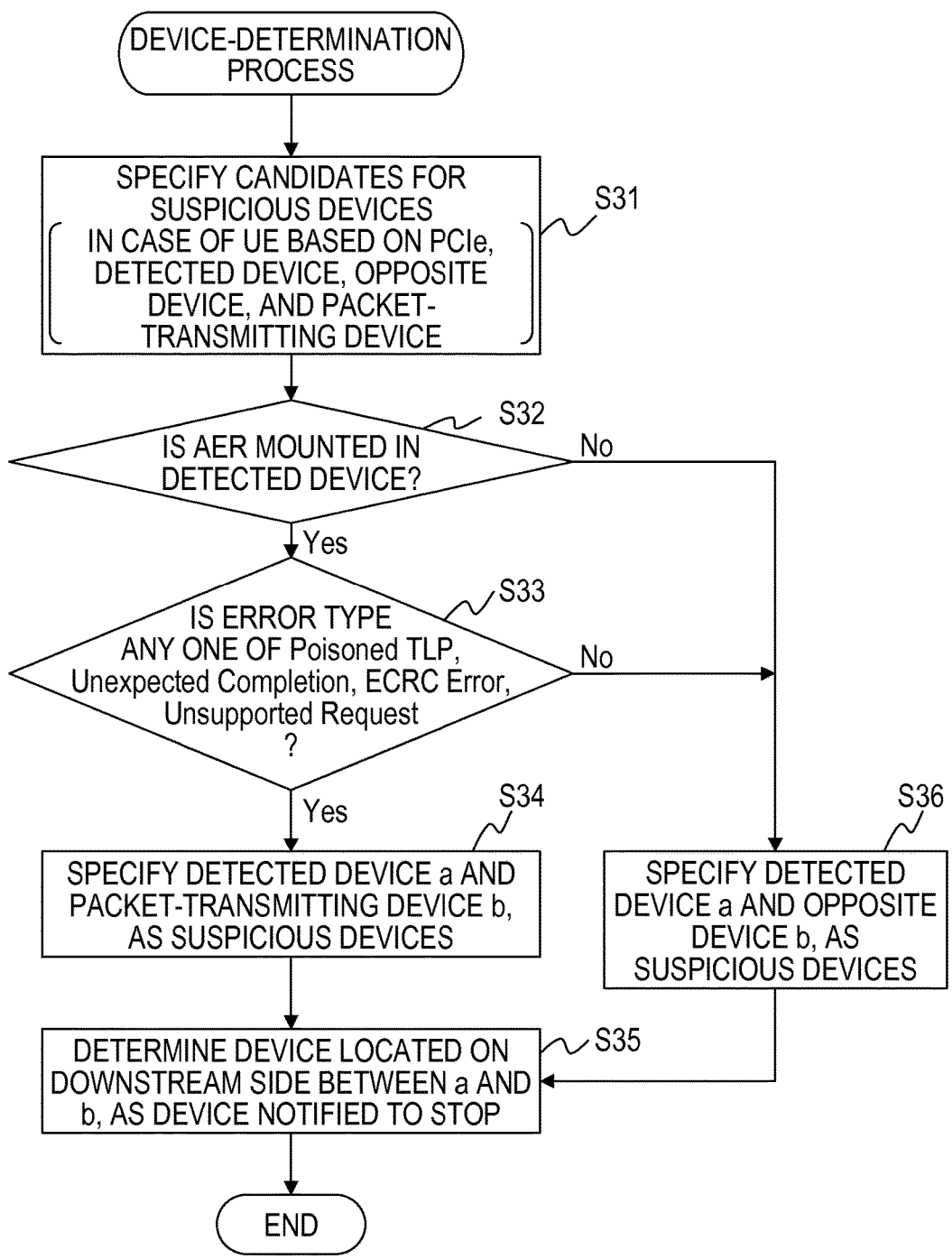
FIG. 5 is a diagram illustrating an example of an operational flowchart for device-determination process for UE, according to an embodiment.

FIG. 5 is a diagram illustrating an example of an operational flowchart for device-determination process for UE which is executed as step S11 in the power-source management process illustrated in FIG. 3. The device-determination process for UE will be described in detail with reference to FIG. 5.

First, the service processor 50 specifies a candidate for a suspicious device (S31). Here, communication devices which are specified as candidates for suspicious devices include a communication device (denoted by a "detected device" in FIG. 5) from which an uncorrectable error is detected, an opposite communication device which is opposite to the communication device, and a packet-transmitting communication device which has transmitted a packet.

Next, the service processor 50 determines whether an AER function is mounted in the communication device from which an uncorrectable error is detected (S32). When the AER function is performed in the communication device from which the error is detected, the determination of step S32 is Yes and the sequence proceeds to step S33. When the AER function is not mounted in the communication device, the determination of step S32 is No and the sequence proceeds to step S36.

In step S33, the service processor 50 determines whether the error type is any one of poisoned TLP, unexpected completion, ECRC error, and unsupported request. The determination process is a process in which the root complex 23 and the end point are considered as the communication device from which an error is detected. Therefore, when the communication device from which an error is detected is the root complex 23 or the end point and the error type is any one of poisoned TLP, unexpected completion, ECRC error, and unsupported request, the determination of step S33 is Yes and the sequence proceeds to step S34. When the communication device from which an error is detected is neither the root complex 23 nor the end point and the error type is not any one of poisoned TLP, unexpected completion, ECRC error, and unsupported request, the determination of step S33 is No and the sequence proceeds to step S36.

In step S34, the service processor 50 specifies the communication device "a" from which an error is detected and a communication device "b" (includes the root complex 23 and the IO device here) which has transmitted a packet, as a suspicious device. Next, the service processor 50 determines a communication device which is located on the more downstream side between the communication device "a" and the communication device "b" specified as suspicious devices, as a communication device to be stopped (denoted by "a device notified to stop" in FIG. 5) (S35). Thereafter, the device-determination process for the UE ends.

In step S36 which is performed when the determination of step S32 or step S33 is No, the service processor 50 specifies the communication device "a" from which an error is detected and the communication device "b" which is opposite to the communication device "a", as suspicious devices. Thereafter, the sequence proceeds to step S35.

The communication device to be stopped which is determined in step S35 is treated as a device notified to stop, when the power-source stop process illustrated in FIG. 4 is performed. Therefore, the range for suppressing power consumption is determined regardless of the error type or whether to stop the communication device.

In the embodiment, power consumption is suppressed when a circumstance is changed by an occurrence of error or the stopped communication device. However, power consumption may also be suppressed by a reason other than the circumstance change. For example, the CPU 20 recognizes the IO device which is connected to the communication device (end point) at the time of initialization. A communication device which is not used for a communication between the CPU 10 and the IO device may be specified by recognizing the IO device. There is no problem even though a power source of the communication device which is not used for a communication between the CPU 20 and the IO device is stopped. Therefore, the initialization (recognition of the IO device) by the CPU 20 may cause power consumption to be suppressed. The communication device which is not used for communication may be specified by setting a connectable end point (if necessary, including a port) in advance to reflect the setting in addition to the recognition result of the IO device. Various modifications may be made from this point of view.

In the embodiment, the communication device corresponding to the PCIe standard is a target whose power consumption is suppressed. However, a standard of the communication device whose power consumption is suppressed is not limited to the PCIe standard. Further, the number of standards is not limited to one.

In the embodiment, the service processor 50 suppresses power consumption of the communication device. However, power consumption may be suppressed by a separate computer. In order to allow an external device to acquire the required information and to control suppression of power consumption, a computer which is present outside the information processing apparatus 1 may be used as a managing device.

In addition to this, various modifications may be made.

Following claims with respect to the embodiments including the above modified embodiment as described above will be further disclosed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus coupled to a plurality of input/output devices, the information processing apparatus comprising:
    an arithmetic processing device, including a first processor, configured to perform a computation;
    a plurality of communication devices each configured to perform a communication between the plurality of input/output devices and the arithmetic processing device;
    a second processor configured to:
        determine a communication device having power consumption that is controllable, among the plurality of communication devices, the communication device being determined as a candidate for power consumption suppression when determined to have a connection relationship to another communication device among the plurality of communication devices; and
        suppress the power consumption of the determined communication device.

2. The information processing apparatus of claim 1, wherein
    the second processor determines the communication device having the power consumption that is controllable, based on an error occurring in the other communication device, any other one of the plurality of communication devices, or an error occurring in the plurality of input/output devices.

3. The information processing apparatus of claim 1, wherein
    when an input/output device, among the plurality of input/output devices, which is coupled to any one of the plurality of communication devices is unrecognized, the second processor determines the communication device as the candidate.

4. The information processing apparatus of claim 1, wherein
    the second processor stops a power source of a communication device that has capacity to stop a power source thereof, among communication devices determined to have power consumption that is controllable by the second processor.

5. A managing device used for an information processing apparatus that is coupled to a plurality of input/output devices, the managing device comprising:
    a processor configured to:
        determine a range where power consumption is controllable, among a plurality of communication devices of the information processing apparatus, the information processing apparatus including an arithmetic processing device configured to perform a computation and the plurality of communication devices which are configured to perform a communication between the plurality of input/output devices and the arithmetic processing device; and
        control power consumption of a communication device having the determined power consumption that is controllable as determined by the processor,
    where the communication device is determined as a candidate to have power consumption controlled when recognized as having a connection relationship to another communication device among the plurality of communication devices.

6. A control method of an information processing apparatus that is coupled to a plurality of input/output devices, the control method comprising:
    determining, by the information processing apparatus, a communication device having power consumption that is controllable, among a plurality of communication devices, the communication device being determined as a candidate for power consumption suppression when determined to have a connection relationship to another communication device among the plurality of communication devices; and
    suppressing, by the information processing apparatus, the power consumption of the determined communication device,
    wherein, the information processing apparatus includes an arithmetic processing device configured to perform a computation and the plurality of communication devices which are configured to perform a communication between the plurality of input/output devices and the arithmetic processing device.

7. A non-transitory, computer-readable recording medium having stored therein a control program for causing a computer included in an information processing apparatus to execute a process, the information processing apparatus being coupled to a plurality of input/output devices, the process comprising:
    determining a communication device having power consumption that is controllable, among a plurality of communication devices, the communication device being determined as a candidate for power consumption suppression when determined to have a connection relationship to another communication device among the plurality of communication devices; and
    suppressing the power consumption of the determined communication device,
    wherein, the information processing apparatus includes an arithmetic processing device configured to perform a computation and the plurality of communication devices which are configured to perform a communication between the plurality of input/output devices and the arithmetic processing device.

* * * * *